June 15, 1926.
S. P. THACHER
1,588,505
TESTING APPARATUS OR COURSE
Filed June 9, 1923    2 Sheets-Sheet 1
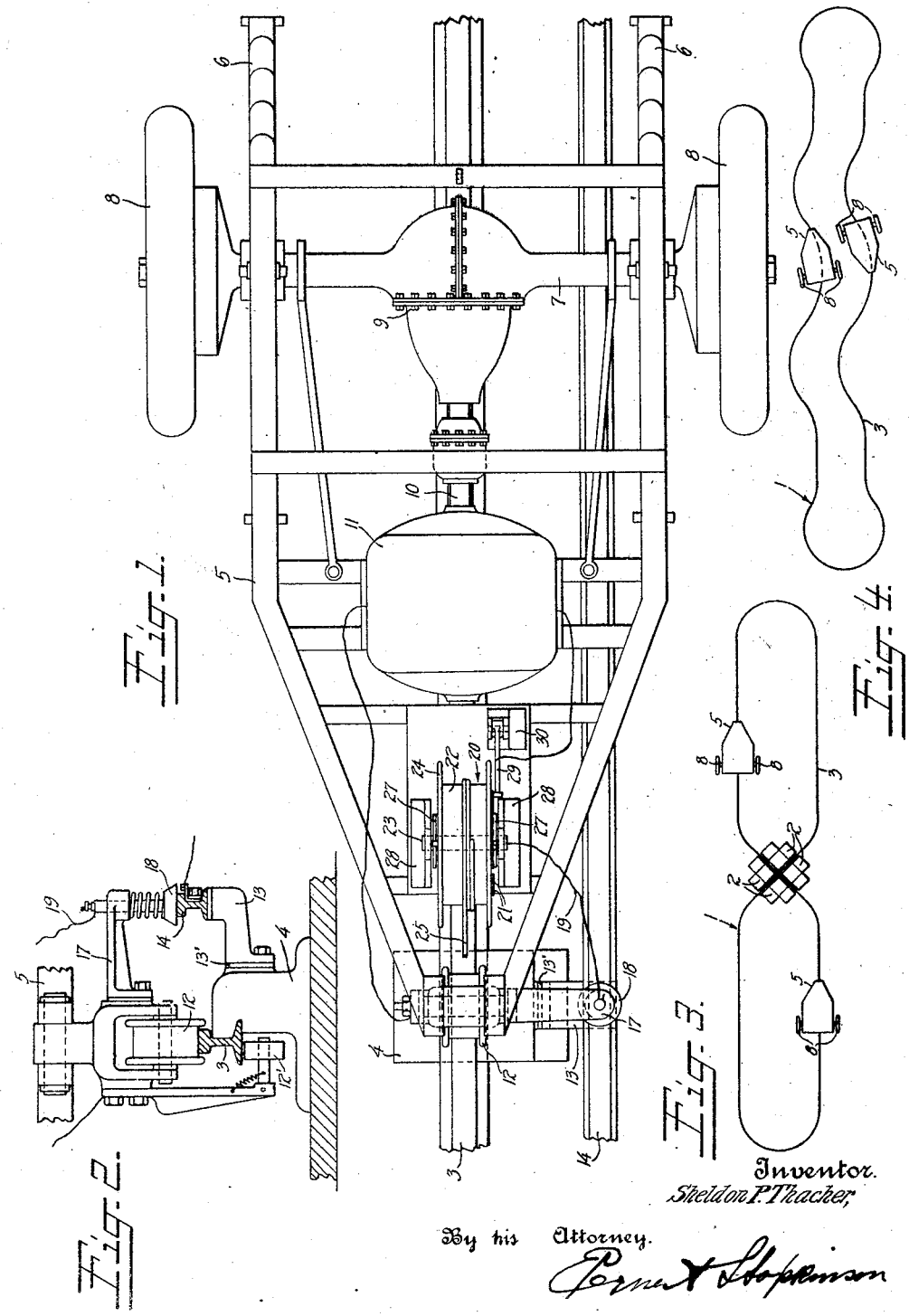
Inventor.
Sheldon P. Thacher,
By his Attorney.

June 15, 1926.
S. P. THACHER
1,588,505
TESTING APPARATUS OR COURSE
Filed June 9, 1923   2 Sheets-Sheet 2
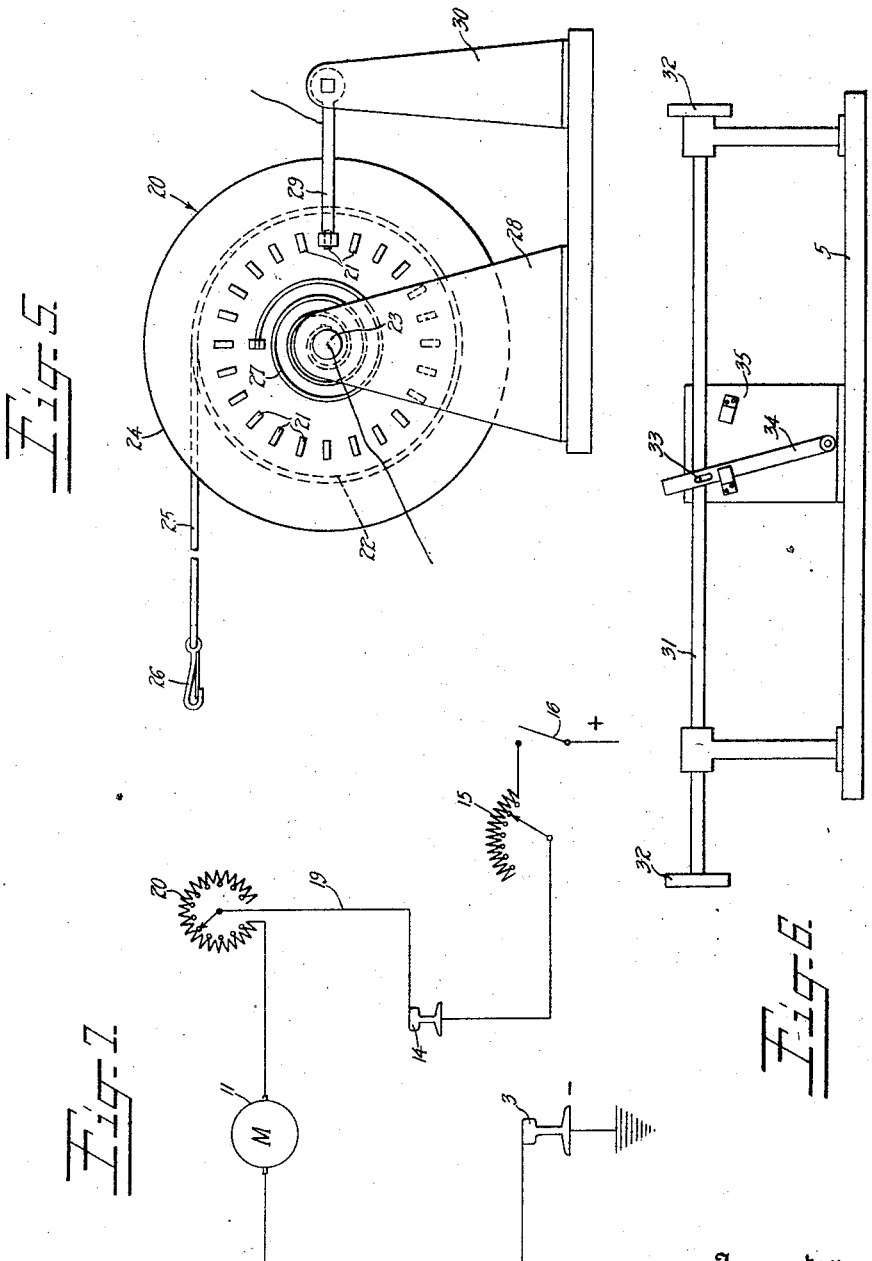
Inventor.
Sheldon P. Thacher,
By his Attorney
Ernest Hopkinson Patented June 15, 1926.

1,588,505

UNITED STATES PATENT OFFICE.

SHELDON P. THACHER, OF FREEHOLD, NEW JERSEY, ASSIGNOR TO MORGAN & WRIGHT, OF DETROIT, MICHIGAN, A CORPORATION OF MICHIGAN.

TESTING APPARATUS OR COURSE.

Application filed June 9, 1923. Serial No. 644,514.

This invention relates to an apparatus or system for testing "unsprung parts" of vehicles and particularly tires.

The manufacturers of automobiles and tires are zealous in maintaining the high quality of their products. Tire manufacturers, for instance, are accustomed to pulling completely cured tires from their daily production and variously examining them to watch the quality. Along with other tests, tires are usually run to more or less complete destruction on a test wheel in the factory or on a test car sent out over the road to undergo the treatment to which the tires are subjected in service.

The present invention aims to provide an apparatus or system particularly for testing any number or kind of tires under precisely the same conditions, so that the results may be comparable, to conduct the tests under conditions substantially duplicate of those to which the tires are subjected on the average car, and to eliminate or minimize the variable personal element. It further aims to provide a system or apparatus which will very materially reduce the cost of testing which, as heretofore done, has been an expense item of no inconsiderable amount. It also aims to provide an apparatus and system in which the atmospheric conditions existing during the test may be maintained constant, or definitely varied, as desired.

With the illustrated embodiment of the invention in mind and without intention to limit its scope more than is required by the prior art, the apparatus or system consists of a course or track surfaced with concrete, cobblestones, dirt and/or obstructions in simulation of roadways on which a plurality of test cars, each having its own propelling motor, may be operated following a path predetermined by a guide-rail, means being provided to govern the supply of power to the motors on the test cars and also, preferably, to keep them running free or separated while they travel around the track.

An embodiment of the invention is illustrated in the accompanying drawings in which:—

Figure 1 is a plan view of a test car, showing a guide-rail and conductor-rail located on the course or track;

Figure 2 is a fragmentary front elevation, showing the forward portion of the car in operating relation to the rails;

Figures 3 and 4 illustrate diagrammatically different tortuous forms of the course or track;

Figure 5 is a side elevation, somewhat enlarged, of the preferred form of rheostat, which appears in plan view in Figure 1;

Figure 6 is a modified form of rheostat and its operating slide-bar or frame;

Figure 7 is a wiring diagram, showing the electrical circuit from the main switch to the grounded guide-rail.

According to the invention, a course or track 1 of any suitable shape, preferably however tortuous and endless, and with or without cross-overs 2, is constructed with portions thereof surfaced with cobblestones, sand, dirt, concrete and/or obstructions in simulation of roadways and the conditions encountered by vehicles in ordinary use. On the course or track is located a guide-rail 3 of any suitable form in cross-section, such as that shown, the guide-rail being suitably supported at intervals by brackets 4, resting on proper foundations in the surface of the course.

While the invention comprehends the testing of any "unsprung parts" of vehicles intermediate the running gear and body or chassis of a car, it is immediately intended for the testing of tires. For this purpose, one or more test cars, a plurality preferably are provided. While the test cars may be variously constructed, a suitable form thereof is disclosed in the drawings and comprises a frame 5, resting on springs 6, which are connected to an axle 7 supported by wheels 8. The wheels 8 may be readily demountable as an entirety, or equipped with demountable rims. The rear axle 7 is preferably rotated through a differential driving mechanism contained in a housing 9 from a main shaft 10, connected with a motor 11 fast to the frame. Forwardly, each frame 5 is preferably equipped with a flanged guide-roller 12 adapted to rest upon the guide-rail 3, insurance against derailment being preferably provided by an auxiliary roller 12', spring-pressed against the bottom of the guide-rail substantially opposite the upper guide-roller 12.

For the propulsion of the test car, any suitable power may be used and the motor may be of any suitable type for utilizing the selected power. A gasoline engine, for instance, might be employed as the motor, but for practical purposes, it is preferred to employ a variable speed electric motor.

When the test cars are to be driven electrically, side arms 13, insulated as indicated at 13', are mounted on the brackets 4, for the support of a conductor or "third" rail 14, supplied with current from an outside source through a primary rheostat 15 and switch 16. An insulated bracket 17 on each of the test cars carries a spring-pressed shoe 18, which is adapted to engage the conductor or "third" rail and carry the current through the wire 19 to the motor, another wire being provided for completing the circuit to the guide-rail which is grounded.

If only a single test car is to be used on the track, its construction may be as above described, but for various reasons, it is highly desirable to use a number of test cars at one and the same time. In order to prevent a plurality of test cars from interfering, and also in order to keep each test car running under its own motive power so that the driving torque is exerted through the tires, it is desirable to provide means for accomplishing these ends. Preferably, therefore, each of the test cars is equipped with an auxiliary rheostat 20, having a large number of contact points 21, which with the resistance (not shown) are mounted to revolve on a drum 22, loose on a fixed shaft 23, the contacts being connected to the resistance, at short intervals, to permit slight variations in the R. P. M. of the motor. This drum is preferably provided with flanges 24 to adapt its periphery to receive and hold the convolutions of a rope or flexible connection 25, anchored at one end to the drum and at the other end provided with a snap-hook 26, for quick attachment to an eye, or other part of the frame of the preceding car. The drum-type rheostat 20 has attached to it one end of each of a pair of coil-springs 27, whose other ends are anchored to the stationary shaft 23. The stationary shaft is preferably supported in standards 28 fast to the frame of the test car, at any convenient point, preferably near the forward end thereof. A stationary brush or contact 29 is preferably provided to cooperate with the contact points 21 of the drum, being mounted on a standard 30 fast to the frame of the car. The drum-type rheostat is, of course, in the line between the shoe contacting the rail 14 and the motor.

A similar spring-type drum might be used to operate the throttle of a gasoline motor through a connecting-rod (not shown) joining a crank-pin on the drum and a reciprocating-rod, or other parts connected to the usual throttle-lever of such motors.

In operation, one or more of the cars are mounted on the track or course with their front rollers resting on the guide-rail and their rear supporting wheels straddling the same, the springs, tires, or other parts, to be subjected to vibrations under service conditions, furnished by the proper surfacing of the course, having been previously mounted on the test cars. Then, an operator who supervises the course or system throws in the switch 16, and gradually brings the cars up to full speed by advancing the movable arm of the primary rheostat 15. Each of the cars having its rope or flexible connection hooked to the car ahead of it, the several cars will travel around the track at spaced intervals, thus subjecting the tires or parts being tested to service conditions, not only of attrition, or abrasion, and vibration, from contact with the surface of the course, but also the driving torque of the motor which acts, in the case of tires at least, ultimately through their walls to the roadway. The rope, or flexible connection, 25, together with the wind-up drum on each of the cars, furnishes a means for maintaining the cars separated. Should any one car lose or gain distance from the cars ahead and behind it, the tension on the rope or flexible connection will be varied, thereby rotating the drum of the rheostat 20 on each car one way or another so as to vary the resistance in series with each motor, thereby varying the current supplied to the motor and consequently, altering the speed of the test car so as to maintain, or tend to maintain, the spacing of the cars. Each test car, therefore, continues to travel around the track under practically its own propulsive agency without any substantial pull or push from the other test car. That is to say, if one test car tends to gain on another immediately behind it, the rope connecting the two pulls upon and revolves the drum of the rheostat on the rear car so as to cut out resistance and allow more current to pass to the motor of the rear car, thus speeding it up. Conversely, if the rear of the two test cars gains on the one in front, the rope or flexible connection slackens, allowing the coiled spring to turn the drum rheostat in the opposite direction and cut in more resistance, thus decreasing the current supplied to the motor on the rear test car and thereby slowing it down.

The invention is believed to be broadly new and of wide scope, and it is to be distinctly understood that many alterations or changes may be made without departure from the principles underlying the same. Previously, the substitution of a gasoline motor for an electric motor has been mentioned. Obviously, also, of course, an overhead trolley-wire could be substituted for the "third" rail with each of the test cars carrying a trolley-pole for making the circuit through the motor. A wireless control on each of the test cars might be employed, but such an expedient is deemed too costly and complicated to be economically practical. Obviously, a series of the cars might be operated as "trailers" of a power-driven front car, but such a manner of testing tires, at least, would not duplicate the driving torque that is applied to the tires in service or daily usage, at least on the "trailers," and is not thought to be as desirable as the preferred form of the invention, illustrated and previously detailed.

In lieu of the rope and drum rheostat illustrated, there might be mounted on each frame a slide-rod or frame 31, having bumper plates 32 on its opposite extremities and projecting from the front and rear of each test car, this slide-rod or frame being coupled by a lost motion connection 33, such as the pin and slot shown, to the movable contact arm 34 of a two-point rheostat 35 in series with each motor, the two points of the rheostat being adapted to change the resistance in series with the motor so as to make the test car travel at plus or minus (that is, slightly over or slightly under) a predetermined number of miles per hour (say 20 or 25 miles).

It will be understood, of course, that the speed of the cars may be varied widely and suited to the particular requirements of the article being tested. The primary rheostat 15 may be utilized to run all the test cars at the desired rates of speed. If a gasoline motor is employed, the usual equipment on a car may be adjusted to accomplish the same end.

In testing tires, it is especially desirable to move each test car by its own motor and, therefore, for this work, it is preferable to employ an auxiliary rheostat on each test car, if it be electrically driven, or a throttle-lever shifting device, such as that previously mentioned, on each car, if it be driven by a gasoline motor. But for testing such "unsprung parts" as springs, only one of the test cars need be power-driven and this one, therefore, may be driven and connected with the remainder by links or drawbars of any suitable construction.

The conductor or "third" rail 14 may be continuous or may be made in sections insulated from each other, the latter preferably. If the "third" rail or conductor is made in sections insulated from one another, bonding wires (not shown) may be detachably secured to the adjacent ends of the sections for making the "third" rail or conductor continuous or interrupted, as desired. When the several sections of the "third" rail or conductor are discontinuous (electrically), the current thereto may be varied to automatically slow down or speed up the test cars in their cycles about the course.

These and other changes may be made in the apparatus and reference should therefore be made to the accompanying claims for an understanding of the full scope and breadth of the invention.

Having thus described my invention, what I claim and desire to protect by Letters Patent is:—

1. A testing apparatus comprising, in combination, an endless course surfaced in simulation of roadways, a plurality of test cars, means on the course for guiding each of the test cars, means on each of the test cars for tracking the guiding means, a motor on each of the test cars for propelling it, and shiftable means carried by the test cars for varying the operation of the motors whereby to maintain the test cars separated while travelling around the course.

2. A testing apparatus comprising an endless course surfaced in simulation of roadways, a guide-rail following said course, an electrically energized conductor paralleling said guide-rail and insulated therefrom, means for controlling the supply of current to said electrically energized conductor, in combination with, a test car having a frame, a pair of supporting wheels on opposite sides of said frame, means on said frame for maintaining contact with said guide-rail and for guiding the test car on said endless course parallel with the guide-rail, a motor on said frame, differential driving connections between said motor and supporting wheels for propulsion of the test car, and means on said frame for passing an electrical current through said motor from said conductor.

3. A testing apparatus comprising an endless course surfaced in simulation of roadways, a guide-rail, an electrical energized conductor paralleling said guide-rail and consisting of a plurality of sections insulated from one another and from said endless course, means for controlling the current supplied to each of said insulated sections of the conductor, in combination with, a test car having a frame, a pair of supporting wheels on opposite sides of said frame, means on said frame for maintaining contact with said guide-rail and for guiding the test car on said endless course parallel with the guide-rail, a motor on said frame, driving connections between said motor and supporting wheels for propulsion of the test car, and means on said frame for passing an electrical current through said motor from said conductor.

4. A testing apparatus comprising an endless course crossing itself at least once and surfaced in simulation of roadways, a guide-rail mounted on said endless course, an electrically energized conductor, in combination with, a test car having a frame, a pair of supporting wheels on opposite sides of said frame and adapted to hold test tires thereon, means on said frame for maintaining rolling contact with said guide-rail and for guiding the test car on said endless course parallel with the guide-rail, a motor on said frame, driving connections between said motor and supporting wheels for propulsion of the test car, and means on said frame for passing an electrical current through said motor from said conductor.

5. A testing apparatus comprising an endless course surfaced in simulation of roadways, a guide-rail mounted on said course, an electrically energized conductor paralleling said guide-rail and insulated therefrom, means for controlling the supply of current to said conductor, in combination with a test car having a frame, a pair of supporting wheels on opposite sides of said frame and adapted to be shod with test tires, a flanged roller located centrally of said frame in advance of said supporting wheels adapted to track said guide-rail, a motor on said frame, driving connections between said motor and supporting wheels, a spring-pressed shoe insulatingly supported by said frame adapted to maintain an electrical connection with said conductor, and means on said frame for conducting an electrical current through said motor from said shoe.

6. A testing apparatus comprising an endless course surfaced in simulation of roadways, a guide-rail mounted on said course, an electrically energized conductor paralleling said guide-rail and insulated therefrom, means for controlling the supply of current to said conductor, in combination with, a test car having a frame, a pair of supporting wheels on opposite sides of said frame adapted to straddle the guide-rail and conductor and also adapted to hold test tires, a flanged roller mounted on said frame in advance of said supporting wheels and adapted to track said guide-rail, a second roller mounted on said frame and adapted to track said guide-rail opposite the first-mentioned roller to prevent derailment, a motor on said frame, driving connections between said motor and supporting wheels, and means on said frame for conducting an electrical current through said motor from said conductor.

7. A testing apparatus comprising a course surfaced in simulation of roadways, a guide-rail following said course, an electrically energized conductor paralleling said guide-rail and insulated therefrom, means for controlling the supply of current to said electrically energized conductor, in combination with, a test car having a frame, a pair of supporting wheels on opposite sides of said frame and adapted to hold test tires thereon, means on said frame for maintaining rolling contact with said guide-rail and for guiding the test car on said course parallel with the guide-rail, a motor on said frame, driving connections between said motor and supporting wheels for propulsion of the test car, means on said frame for passing an electrical current through said motor from said conductor, a rheostat on said frame in series with said motor, and means for operating said rheostat to vary the current supplied to the motor as the test car varies its distance from another and similar test car on the course therewith.

8. A testing apparatus comprising a course surfaced in simulation of roadways, a guide-rail on said course, an electrically energized conductor parallel said guide-rail and insulated therefrom, means for controlling the supply of current to said conductor, in combination with, a plurality of test cars each having a frame, a pair of supporting wheels on opposite sides of said frame and adapted to hold test tires thereon, means on said frame for maintaining rolling contact with said guide-rail and for guiding the test car on said course parallel with the guide-rail, a motor on said frame, driving connections between said motor and supporting wheels for propulsion of the test car, means on said frame for passing an electrical current through said motor from said conductor, and means for maintaining the plurality of test cars in separated relation while being independently driven through their rear supporting wheels.

9. A testing apparatus comprising a course surfaced in simulation of roadways, a guide-rail on said course, an electrically energized conductor parallel said guide-rail and insulated therefrom, means for controlling the supply of current to said conductor, in combination with, a plurality of test cars each having a frame, a pair of supporting wheels on opposite sides of said frame and adapted to hold test tires thereon, means on said frame for maintaining rolling contact with said guide-rail and for guiding the test car on said course parallel with the guide-rail, a motor on said frame, driving connections between said motor and supporting wheels for propulsion of the test car, means on said frame for passing an electrical current through said motor from said conductor, each of said test cars also having a rheostat mounted thereon and including a drum element and a stationary element with a plurality of contacting points, means urging the drum element and the stationary element in a direction varying the supply of current through the rheostat to the motor, and flexible means interconnecting the frame of each test car with the rheostat of the following car for operating the rheostat whereby variations in the distance between test cars may be utilized to maintain them travelling at substantially the same speed and in spaced apart relation and under the propulsion of their respective motors.

Signed at New York city, county of New York, and State of New York, this 7th day of June, 1923.

SHELDON P. THACHER.